(12) United States Patent
Tanaka

(10) Patent No.: US 11,325,478 B2
(45) Date of Patent: May 10, 2022

(54) CONTROL APPARATUS, VEHICLE SYSTEM, AND CONTROL METHOD

(71) Applicant: HONDA MOTOR CO., LTD., Tokyo (JP)

(72) Inventor: Masaki Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/029,174

(22) Filed: Sep. 23, 2020

(65) Prior Publication Data

US 2021/0086624 A1  Mar. 25, 2021

(30) Foreign Application Priority Data

Sep. 25, 2019 (JP) .............................. JP2019-173980

(51) Int. Cl.
| | | |
|---|---|---|
| H02P 27/04 | (2016.01) | |
| B60L 15/08 | (2006.01) | |
| B60L 15/02 | (2006.01) | |
| H02P 27/12 | (2006.01) | |
| B60L 15/10 | (2006.01) | |

(52) U.S. Cl.
CPC ............. *B60L 15/08* (2013.01); *B60L 15/025* (2013.01); *B60L 15/10* (2013.01); *H02P 27/12* (2013.01); *B60L 2240/423* (2013.01); *B60L 2240/429* (2013.01)

(58) Field of Classification Search
CPC ........ B60L 15/08; B60L 15/025; B60L 15/10; H02P 27/12

USPC ......................................................... 318/801
See application file for complete search history.

(56) References Cited

U.S. PATENT DOCUMENTS

| | | | |
|---|---|---|---|
| 5,382,890 A | 1/1995 | Moh et al. | |
| 2011/0193509 A1* | 8/2011 | Ooyama .................. | H02M 1/12 318/503 |
| 2012/0173066 A1* | 7/2012 | Yamada .................. | H02P 21/18 701/22 |

FOREIGN PATENT DOCUMENTS

| | | |
|---|---|---|
| JP | 10-234199 | 9/1998 |
| JP | 2007-181400 | 7/2007 |
| JP | 2009-100548 | 5/2009 |
| JP | 2011-239680 | 11/2011 |

OTHER PUBLICATIONS

Japanese Office Action for Japanese Patent Application No. 2019-173980 dated Jun. 29, 2021.

* cited by examiner

*Primary Examiner* — Erick D Glass
(74) *Attorney, Agent, or Firm* — Amin, Turocy & Watson, LLP

(57) ABSTRACT

A control apparatus controls an inverter which outputs electric power to an electric motor. The control apparatus calculates a magnitude of a drive current at a one-pulse control time based on an electric motor drive torque, a rotation number of the electric motor, and a DC voltage of the electric motor and thereby determines which one of a one-pulse control and a pulse-width modulation control is employed as a control method of the inverter.

7 Claims, 9 Drawing Sheets

CONTROL APPARATUS, VEHICLE SYSTEM, AND CONTROL METHOD

CROSS-REFERENCE TO RELATED APPLICATION

Priority is claimed on Japanese Patent Application No. 2019-173980, filed on Sep. 25, 2019, the contents of which are incorporated herein by reference.

BACKGROUND

Field of the Invention

The present invention relates to a control apparatus, a vehicle system, and a control method.

Background

In the related art, techniques relating to a drive control of an electric vehicle have been known (for example, refer to Japanese Unexamined Patent Application, First Publication No. 2009-100548).

SUMMARY

In a control of an inverter circuit for driving a motor, the electric vehicle according to the related art described above performs a control using a one-pulse control. Generally, it is known that in a case where the one-pulse control is used, the efficiency (for example, an electric power cost) of an electric motor control is improved, for example, compared to a case where a multiple-pulse control such as a PWM control is used.

However, in the electric vehicle according to the related art, there may be cases in which an excess current flows into the electric motor when using the one-pulse control. Accordingly, in the related art, it is difficult to use the one-pulse control in order to avoid an excess current flowing into the electric motor, and there is a problem in that it is impossible to improve the efficiency of the electric motor control.

An object of an aspect of the present invention is to provide a control apparatus capable of improving the efficiency of an electric motor control while preventing an excess current.

A control apparatus according to a first aspect of the present invention is a control apparatus that controls an inverter which outputs electric power to an electric motor, wherein the control apparatus calculates a magnitude of a drive current at a one-pulse control time based on an electric motor drive torque of the electric motor, a rotation number of the electric motor, and a DC voltage of the electric motor and determines, based on the drive current having the calculated magnitude, which one of a one-pulse control and a pulse-width modulation control is employed as a control method of the inverter.

As a second aspect of the present invention, the control apparatus according to the first aspect may employ the one-pulse control in a case where a magnitude of the drive current is less than a predetermined upper limit value.

As a third aspect of the present invention, the control apparatus according to the first aspect may have an excess-current prevention calculation map indicating a range in which the one-pulse control is performable by a correspondence relationship among the electric motor drive torque, the rotation number, and the DC voltage and may determine which one of the one-pulse control and the pulse-width modulation control is employed according to a comparison between the rotation number and a range of the rotation number in which the one-pulse control is performable that is calculated based on the excess-current prevention calculation map, the electric motor drive torque, and the DC voltage.

As a fourth aspect of the present invention, the control apparatus according to the first aspect may have an excess-current prevention calculation map indicating a range in which the one-pulse control is performable by a correspondence relationship among the electric motor drive torque, the rotation number, and the DC voltage and may determine which one of the one-pulse control and the pulse-width modulation control is employed according to a comparison between the electric motor drive torque and a range of the electric motor drive torque in which the one-pulse control is performable that is calculated based on the excess-current prevention calculation map, the rotation number, and the DC voltage.

A fifth aspect of the present invention is a vehicle system including: the control apparatus according to any one of the first to fourth aspects; and a drive wheel that is driven by the control apparatus.

A control method according to a sixth aspect of the present invention includes: controlling an inverter which outputs electric power to an electric motor; calculating a magnitude of a drive current at a one-pulse control time based on an electric motor drive torque of the electric motor, a rotation number of the electric motor, and a DC voltage of the electric motor; and determining, based on the drive current having the calculated magnitude, which one of a one-pulse control and a pulse-width modulation control is employed as a control method of the inverter.

According to the first to sixth aspects described above, it is possible to provide a control apparatus, a vehicle system, and a control method capable of improving the efficiency of an electric motor control while preventing an excess current.

DESCRIPTION OF THE EMBODIMENTS

Embodiment

Hereinafter, an embodiment of the present invention will be described with reference to the drawings.

Figure 1:
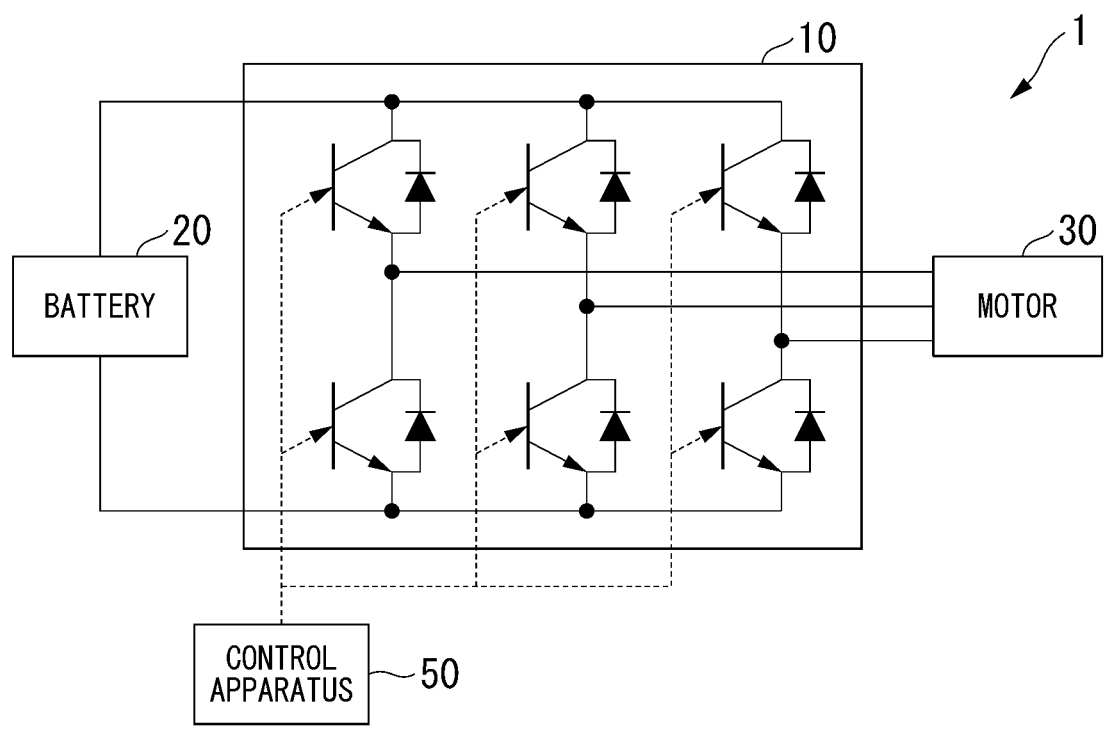
FIG. 1 is a view showing an example of a functional configuration of a vehicle control apparatus according to an embodiment.

FIG. 1 is a view showing an example a functional configuration of a vehicle control apparatus 1 according to an embodiment. The vehicle control apparatus 1 of the present embodiment is mounted on an electric vehicle or the like. The electric vehicle includes a variety of vehicles such as an electric vehicle, a hybrid electric vehicle (HEV), and a fuel cell vehicle (FCV). The electric vehicle is driven using a battery as a power source. The hybrid electric vehicle is driven using a battery and an internal combustion engine as a power source. The fuel cell vehicle is driven using a fuel cell as a drive source. In the following description, when the types of these vehicles are not distinguished, the vehicles are collectively referred to as an electric vehicle.

A drive scheme of the hybrid electric vehicle includes a parallel scheme, a series scheme (including a range extender scheme), a series/parallel scheme, and the like. The control apparatus of the present embodiment can be applied to the drive scheme described above and can also be mounted on vehicles of various drive schemes using an electric motor as a power source.

In the following description, the same reference numeral may be used for components having the same function, and descriptions thereof may be omitted.

[Functional Configuration of Vehicle Control Apparatus 1]

The vehicle control apparatus 1 includes a battery 20, an inverter 10, a motor 30, and a control apparatus 50.

The battery 20 is charged by an external electric power source in a state of being mounted on a vehicle. The battery 20 can also be charged by an external charger in a state of being removed from the vehicle. The battery 20 supplies electric power to the motor 30 and another in-vehicle equipment.

The motor 30 generates power (drive force) for traveling of the vehicle. The motor 30 is operable, for example, by using electric power output by the battery 20. The power of the motor 30 is transmitted to an axle (not shown) via a transmission (not shown). The motor 30 functions as a regeneration generator at a time of deceleration and braking of the vehicle and outputs the generated electric power to the battery 20. In an example, the motor 30 is a three-phase AC motor. In the following description, the motor 30 may be referred to as an electric motor.

The inverter 10 is electrically connected to and between the battery 20 and the motor 30. The inverter 10 drives the motor 30 by converting DC electric power that is output by the battery 20 into AC electric power and outputting the converted AC electric power to the motor 30. The inverter 10 charges the battery 20 by converting AC electric power that is output by the motor 30 into DC electric power and outputting the converted DC electric power to the battery 20.

Specifically, the inverter 10 controls whether or not a current flows into each phase of the motor 30 by controlling a connection state of a plurality of switching elements. The inverter 10 controls a direction of the current that flows into each phase of the motor 30.

More specifically, the switching element is a semiconductor switching element. As an example, the switching element is an IGBT (Insulated Gate Bipolar Transistor), a power MOS (Metal Oxide Semiconductor) transistor, a power bipolar transistor, and the like.

The inverter 10 may be included in a PDU (Power Drive Unit) (not shown).

The control apparatus 50 may be formed as a hardware function part that functions by an integrated circuit or the like, or may be formed as a software function part that functions by a predetermined program being executed by a processor such as a CPU (Central Processing Unit). The software function part is an ECU (Electronic Control Unit) that includes a processor such as a CPU, a ROM (Read Only Memory) that stores a program, a RAM (Random Access Memory) that temporarily stores data, and electronic circuitry such as a timer.

The control apparatus 50 acquires information regarding driving of the motor 30, such as a motor drive torque, a motor rotation number, and a DC voltage and controls the inverter 10 on the basis of the acquired information.

Here, the inverter 10 supplies electric power to the motor. That is, the control apparatus 50 controls the inverter 10 that outputs electric power to the motor (electric motor). The control apparatus 50 drives a drive wheel included in the vehicle by controlling the inverter 10 in a vehicle system.

[Functional Configuration of Control Apparatus 50]

Figure 2:
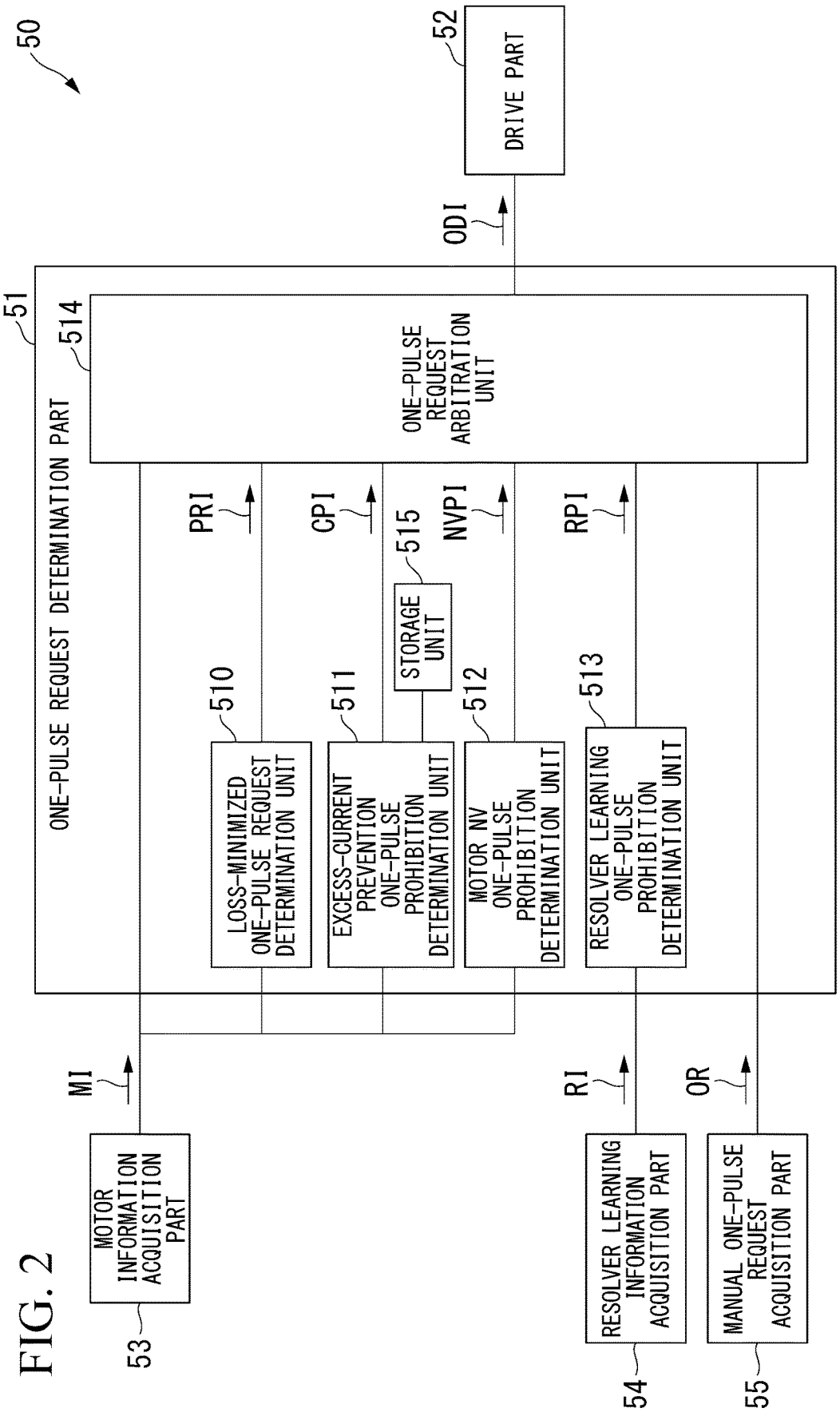
FIG. 2 is a view showing an example of a functional configuration of a control apparatus according to the embodiment.

FIG. 2 is a view showing an example of a functional configuration of the control apparatus 50 according to the embodiment.

The control apparatus 50 includes a one-pulse request determination part 51, a drive part 52, a motor information acquisition part 53, and a resolver learning information acquisition part 54.

The motor information acquisition part 53 acquires motor information MI from a current sensor (not shown), a voltage sensor (not shown), a rotation angle sensor (not shown) such as a resolver, and the like. The motor information MI acquired by the motor information acquisition part 53 may include information (for example, information of a drive torque calculated from a drive current value obtained from the current sensor) calculated from information obtained from the current sensor, the voltage sensor, the rotation angle sensor such as a resolver, and the like.

The motor information MI is information regarding a drive state of the motor 30. The motor information MI is, for example, a drive torque, a line voltage (DC voltage), a rotation angle, a rotation number, and the like of the motor 30.

The motor information acquisition part 53 provides the acquired motor information MI to the one-pulse request determination part 51.

The resolver learning information acquisition part 54 acquires resolver learning information RI from a non-volatile memory (not shown).

A resolver is a rotation angle sensor (phase sensor) that detects a rotation angle of the motor 30. The information of the rotation angle of the motor 30 detected by the resolver is used for calculating the rotation number of the motor 30 and the like.

The resolver learning information RI is information regarding learning of the resolver. The learning of the resolver is a calibration. Specifically, the learning of the resolver means storing of a correspondence relationship among a rotor reference angle of the motor 30, an output signal of the resolver, and an assembly angle. When the resolver is assembled to the motor 30, a displacement of an angle occurs. The learning of the resolver is performed when calibrating the assembly angle of the resolver relative to the rotor reference angle of the motor 30. In an example, information to be learned by the resolver is a relationship between a physical reference angle of the rotor and a phase angle of an output signal of the resolver. By performing the learning of the resolver, it is possible to calibrate the displacement of the angle.

For example, the learning of the resolver is performed at a time of a shipping inspection in a factory and at a time of a service at a dealer or a maintenance shop.

The non-volatile memory (not shown) stores learning information (a relationship between the physical reference angle of the rotor and the phase angle of the output signal of the resolver or the like) of the resolver as the resolver learning information RI. The resolver learning information RI may include information on whether the resolver has learned or has not learned. In the following description, the resolver learning information RI may also be referred to as sensor learning information.

The resolver learning information acquisition part 54 provides the resolver learning information RI to the one-pulse request determination part 51.

The one-pulse request determination part 51 includes a loss-minimized one-pulse request determination unit 510, an excess-current prevention one-pulse prohibition determination unit 511, a motor NV one-pulse prohibition determination unit 512, a resolver learning one-pulse prohibition determination unit 513, a one-pulse request arbitration unit 514, and a storage unit 515.

In an example, the one-pulse request determination part 51 determines whether or not a one-pulse control is performed on the basis of the motor information MI acquired from the motor information acquisition part 53 and the resolver learning information RI acquired from the resolver learning information acquisition part 54. The one-pulse request determination part 51 provides information on whether or not the one-pulse control is performed to the drive part 52 as one-pulse drive information ODI.

[One-Pulse Control and PWM Control]

Here, the one-pulse control and a PWM (Pulse Width Modulation) control are described.

Both the one-pulse control and the PWM control are control methods relating to driving of the motor 30. In an example, the one-pulse control is a method of driving the motor 30 by one pulse applied at a cycle similar to a switching cycle of a line voltage applied to the motor 30.

The PWM control is an example of a multi-pulse control. The multi-pulse control broadly includes motor control methods other than the one-pulse control.

Figure 3:
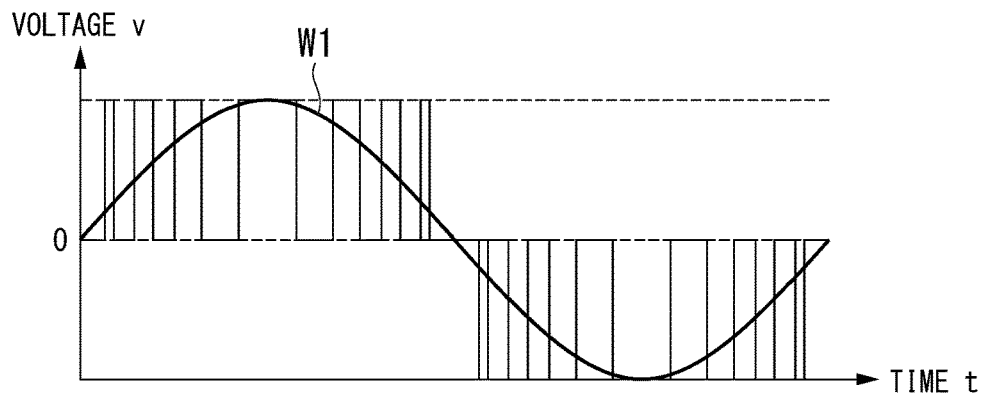
FIG. 3 is a view showing an example of a voltage waveform of a sinusoidal PWM control according to the embodiment.

The PWM control includes a sinusoidal PWM control, an overmodulation PWM control, and the like. Both the sinusoidal PWM control and the overmodulation PWM control perform a control of an amplitude and a phase of the voltage applied to the motor 30 by a feedback control to a current of the motor 30. With reference to FIG. 3, the sinusoidal PWM control is described. Then, with reference to FIG. 4, the overmodulation PWM control is described.

FIG. 3 is a view showing an example of a voltage waveform of the sinusoidal PWM control according to the embodiment. FIG. 3 shows a magnitude of a voltage according to one phase of the motor 30 using a horizontal axis as a time. In an example of FIG. 3, by changing a duty ratio of a pulse, an energy equivalent to that of a sinusoidal wave W1 is applied to the motor 30. That is, the sinusoidal PWM control is a control method that maintains a linearity between a voltage value and a PWM signal by performing a pulse-width modulation in a state where an amplitude of a voltage value of the sinusoidal wave W1 is equal to or less than an amplitude of a voltage applied between lines of the motor 30.

Figure 4:
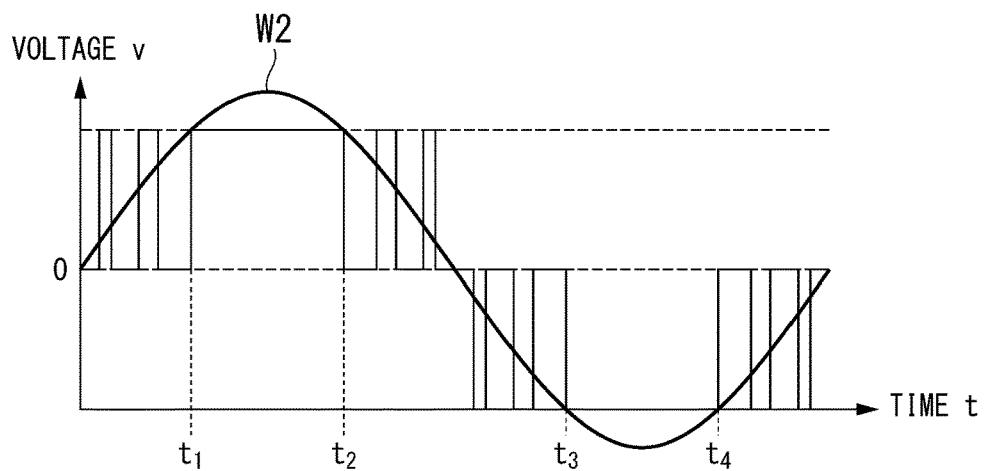
FIG. 4 is a view showing an example of a voltage waveform of an overmodulation PWM control according to the embodiment.

FIG. 4 is a view showing an example of a voltage waveform of the overmodulation PWM control according to the embodiment. FIG. 4 shows a magnitude of a voltage according to one phase of the motor 30 using a horizontal axis as a time.

The overmodulation PWM control permits a non-linearity between a voltage value and a PWM signal by performing a pulse-width modulation in a state where an amplitude of a voltage value of a sinusoidal wave W2 is larger than an amplitude of a voltage applied between lines of the motor 30. That is, the overmodulation PWM control is a control method in which a line voltage of the motor 30 having a sinusoidal waveform is distorted so as to approach a rectangular waveform, and a voltage utilization ratio is increased compared to a case where the line voltage has a sinusoidal waveform.

In an example of FIG. 4, a value of the sinusoidal wave W2 exceeds an actually applied voltage value in a period of time from a time $t_1$ to a time $t_2$ and a period of time from a time $t_3$ to a time $t_4$ (in the following description, also referred to as a non-linear period). That is, in the example of FIG. 4, the line voltage of the motor 30 approaches the rectangular waveform from the sinusoidal waveform, and the voltage utilization ratio is increased in the period of time from the time $t_1$ to the time $t_2$ and the period of time from the time $t_3$ to the time $t_4$.

Figure 5:
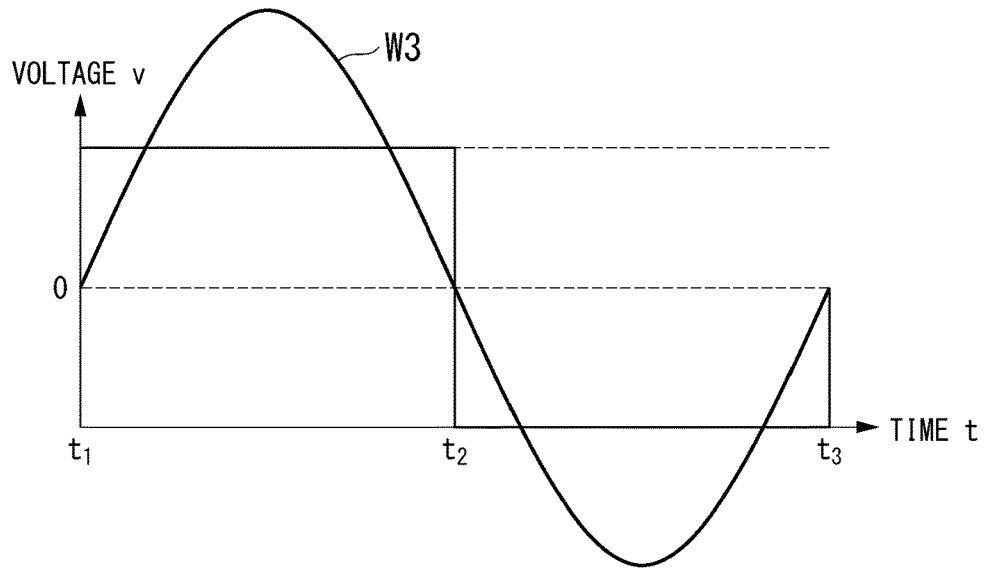
FIG. 5 is a view showing an example of a voltage waveform of a one-pulse control according to the embodiment.

FIG. 5 is a view showing an example of a voltage waveform of the one-pulse control according to the embodiment. FIG. 5 shows a magnitude of a voltage according to one phase of the motor 30 using a horizontal axis as a time.

In the one-pulse control, switching is performed twice in one cycle. In an example of FIG. 5, switching is performed only at two time points which are a time $t_1$ and a time $t_2$ in one cycle from the time $t_1$ to a time $t_3$ that is the same cycle as a cycle of a sinusoidal wave W3. According to the one-pulse control, the voltage utilization ratio is further increased compared to the sinusoidal PWM control and the overmodulation PWM control.

In the PWM control (for example, the sinusoidal PWM control or the overmodulation PWM control), the amount of energy given to the motor 30 is controlled by switching. In the sinusoidal PWM control, switching is performed in order to maintain the linearity between the voltage value and the PWM signal. In the overmodulation PWM control, switching is not performed in the non-linear period, but switching is performed in order to maintain the linearity between the voltage value and the PWM signal other than in the non-linear period. Accordingly, when comparing the number of switching times of the sinusoidal PWM control with the number of switching times of the overmodulation PWM control, the number of switching times of the overmodulation PWM control is smaller.

On the other hand, in the one-pulse control, switching is performed only twice in one cycle. Accordingly, the number of switching times of the one-pulse control is smaller compared to the number of switching times of the sinusoidal PWM control and the number of switching times of the overmodulation PWM control.

In this way, the number of switching times of the one-pulse control is reduced compared to the PWM control (for example, the sinusoidal PWM control or the overmodulation PWM control). Accordingly, the one-pulse control can reduce electric power loss due to switching compared to the PWM control.

With reference back to FIG. 1, configuration elements included in the one-pulse request determination part 51 are described.

The loss-minimized one-pulse request determination unit 510 acquires motor information MI from the motor information acquisition part 53. The loss-minimized one-pulse request determination unit 510 calculates a drive efficiency on the basis of the acquired motor information MI. The loss-minimized one-pulse request determination unit 510 determines whether or not the one-pulse control is performed on the basis of the calculated drive efficiency.

As described above, the motor information MI includes the electric motor drive torque (drive torque of the motor 30), and the rotation number and the DC voltage of the electric motor (motor 30). That is, the loss-minimized one-pulse request determination unit 510 calculates the drive efficiency on the basis of the electric motor drive torque (drive torque of the motor 30) and the rotation number and the DC voltage of the electric motor (motor 30) and uses the drive efficiency for a predetermined condition.

The loss-minimized one-pulse request determination unit 510 provides loss-minimized one-pulse request information PRI which is information indicating whether or not the one-pulse drive is performed to the one-pulse request arbitration unit 514.

The excess-current prevention one-pulse prohibition determination unit 511 acquires motor information MI from the motor information acquisition part 53. The motor information MI includes an electric motor drive torque (drive torque of the motor 30), a rotation number (rotation number of the motor 30) of the electric motor, and a DC voltage (line voltage of the motor 30) of the electric motor. The excess-current prevention one-pulse prohibition determination unit 511 determines the feasibility of the one-pulse control by calculating the magnitude of the drive current at a time of the one-pulse control on the basis of the acquired motor information MI (that is, on the basis of the electric motor drive torque, the rotation number of the electric motor, and the DC voltage of the electric motor). The magnitude of the drive current is, for example, a current value of the drive current.

That is, the excess-current prevention one-pulse prohibition determination unit 511 determines which one of the one-pulse control and the pulse-width modulation control is employed as a control method of the inverter on the basis of the electric motor drive torque, the rotation number of the electric motor, and the DC voltage of the electric motor.

Hereinafter, a specific example of the feasibility determination of the one-pulse control by the excess-current prevention one-pulse prohibition determination unit 511 is described.

(1) Feasibility Determination According to Comparison Between Drive Current Value at One-Pulse Control Time and Predetermined Upper Limit Current Value In one example, the storage unit 515 stores a calculation formula of the drive current at a one-pulse control time and a predetermined upper limit current value.

Figure 6:
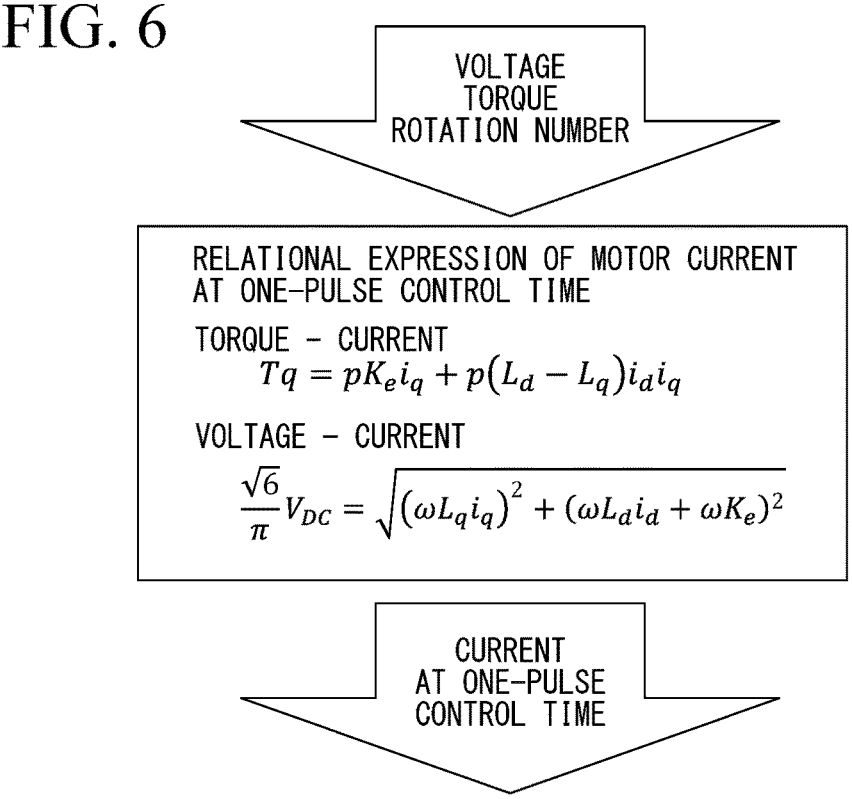
FIG. 6 is a view showing an example of a calculation formula of a drive current at a one-pulse control time according to the embodiment.

FIG. 6 is a view showing an example of a calculation formula of a drive current at a one-pulse control time according to the embodiment. The storage unit 515 stores a relationship formula between an electric motor drive torque and a drive current at a one-pulse control time and a relationship formula between a DC voltage and a drive current at a one-pulse control time shown in FIG. 6. Here, Tq is an electric motor drive torque, p is the number of pole pairs of the motor 30, Ke is a field interlinkage magnetic flux, id is a d-axis drive current at a one-pulse control time, iq is a q-axis drive current at a one-pulse control time, Ld is a d-axis inductance, Lq is a q-axis inductance, VDC is a DC voltage, and ω is an angular velocity. A d-axis is a field axis, and a q-axis is a torque axis.

When the electric motor drive torque, the rotation number of the electric motor, and the DC voltage of the electric motor are given as an argument to the relationship formula between an electric motor drive torque and a drive current at a one-pulse control time and the relationship formula between a DC voltage and a drive current at a one-pulse control time that are stored in the storage unit 515, a drive current at a one-pulse control time is calculated.

The excess-current prevention one-pulse prohibition determination unit 511 calculates the magnitude of the drive current at the one-pulse control time on the basis of the electric motor drive torque, the rotation number of the electric motor, and the DC voltage of the electric motor that are included in the acquired motor information MI and the above-described relationship formulas stored in the storage unit 515. The excess-current prevention one-pulse prohibition determination unit 511 compares the calculated magnitude of the drive current at the one-pulse control time with the predetermined upper limit current value stored in the storage unit 515. The excess-current prevention one-pulse prohibition determination unit 511 determines that the electric motor is driven under the one-pulse control in a case where the magnitude of the drive current at the one-pulse control time is equal to or less than the predetermined upper limit current value as a result of the comparison.

(2) Feasibility Determination According to Excess-Current Prevention Calculation Map In an example, an excess-current prevention calculation map MP is stored in the storage unit 515. The excess-current prevention calculation map MP shows a range where the one-pulse control is performable using a correspondence relationship among the electric motor drive torque, the rotation number of the electric motor, and the DC voltage of the electric motor.

Figure 7:
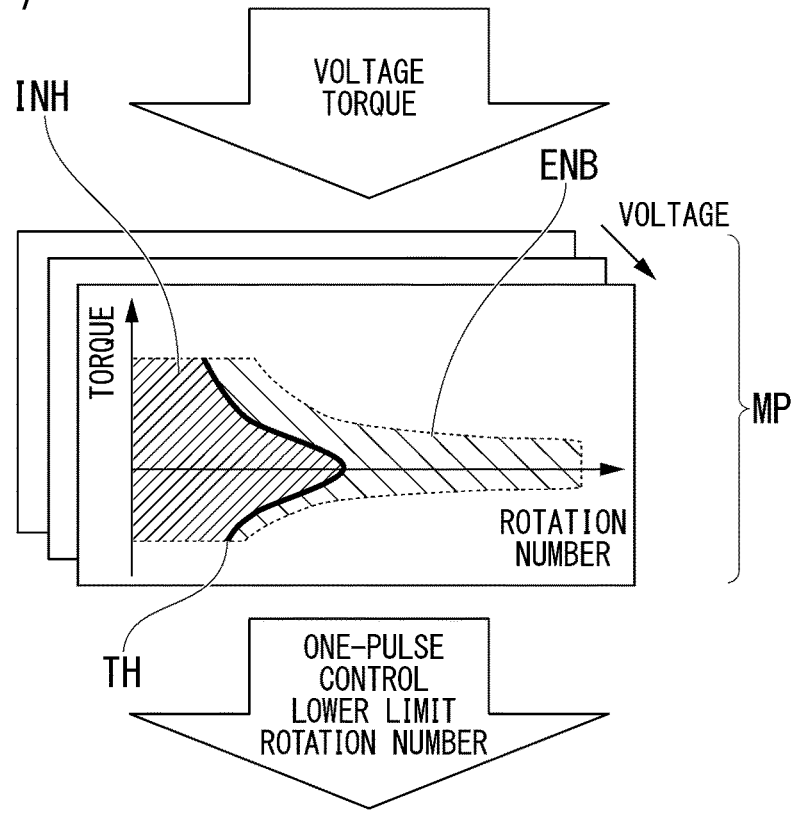
FIG. 7 is a view showing an example of a feasibility determination procedure of the one-pulse control on the basis of a DC voltage and an electric motor drive torque according to the embodiment.

(2-1) Feasibility Determination of One-Pulse Control Based on DC Voltage and Electric Motor Drive Torque FIG. 7 is a view showing an example of a feasibility determination procedure of the one-pulse control on the basis of a DC voltage and an electric motor drive torque according to the embodiment.

As described above, the excess-current prevention calculation map MP is stored in the storage unit 515.

The excess-current prevention calculation map MP includes an electric motor drive torque axis and a rotation number axis of an electric motor for each magnitude of the DC voltage. In the excess-current prevention calculation map MP, a one-pulse controllable region ENB and a one-pulse control prohibition region INH are stored in advance using a threshold value TH defined by a correspondence relationship between the electric motor drive torque and the rotation number of the electric motor as a boundary.

An expression format of the excess-current prevention calculation map MP shown here is an example, and an arbitrary expression format may be used as long as the format indicates a range in which the one-pulse control is performable by a correspondence relationship among the electric motor drive torque, the rotation number of the electric motor, and the DC voltage of the electric motor.

When an electric motor drive torque and a DC voltage are given as arguments to the excess-current prevention calculation map MP stored in the storage unit 515, a lower limit value of the rotation number of the electric motor at which the one-pulse control is performable at the electric motor drive torque and the DC voltage, that is, a one-pulse control lower limit rotation number, is calculated. The one-pulse control lower limit rotation number is an example of an index indicating a range of the rotation number of the electric motor at which the one-pulse control is performable.

The excess-current prevention one-pulse prohibition determination unit 511 calculates the one-pulse lower limit rotation number on the basis of the electric motor drive torque and the DC voltage that are included in the acquired motor information MI and the excess-current prevention calculation map MP that is stored in the storage unit 515. The excess-current prevention one-pulse prohibition determination unit 511 compares the calculated one-pulse control lower limit rotation number with the rotation number of the electric motor included in the motor information MI. The excess-current prevention one-pulse prohibition determination unit 511 determines that the electric motor is driven under the one-pulse control in a case where, as a result of the comparison, the rotation number of the electric motor exceeds the one-pulse control lower limit rotation number.

That is, the excess-current prevention one-pulse prohibition determination unit 511 drives the electric motor under the one-pulse control according to a comparison between the rotation number of the electric motor and the range of the rotation number of the electric motor in which the one-pulse control is performable that is calculated on the basis of the excess-current prevention calculation map MP, the electric motor drive torque, and the DC voltage.

Figure 8:
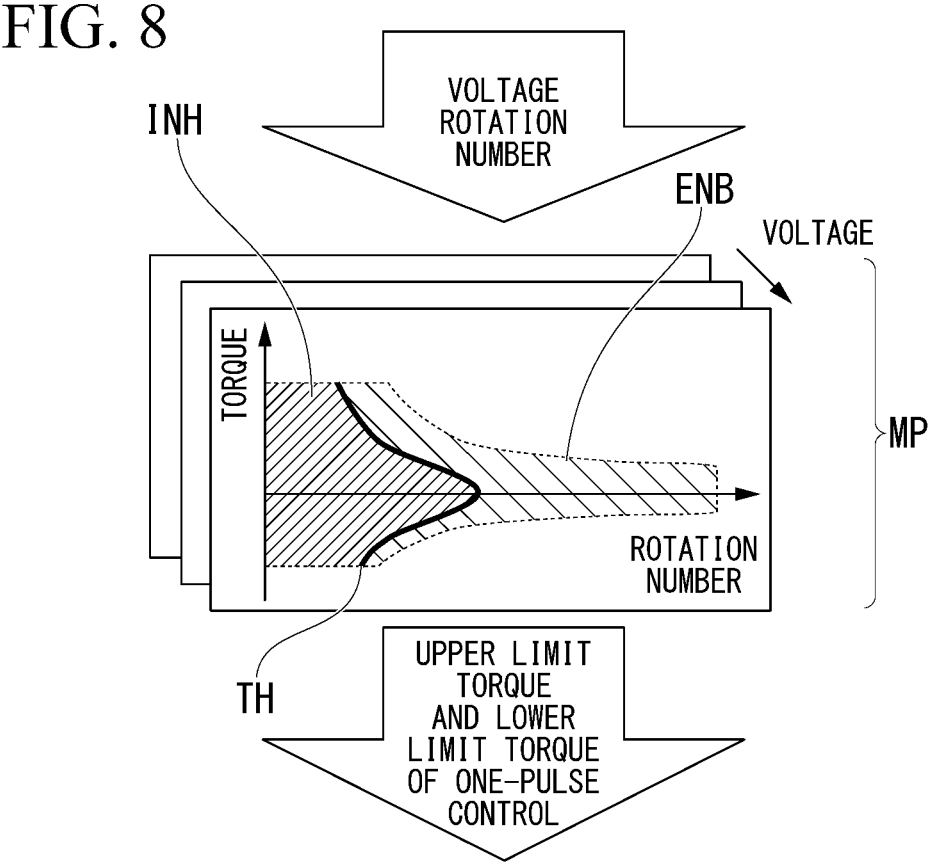
FIG. 8 is a view showing an example of a feasibility determination procedure of the one-pulse control on the basis of a DC voltage and a rotation number of an electric motor according to the embodiment.

(2-2) Feasibility Determination of One-Pulse Control Based on DC Voltage and Rotation Number of Electric Motor FIG. 8 is a view showing an example of a feasibility determination procedure of the one-pulse control on the basis of a DC voltage and a rotation number of an electric motor according to the embodiment.

As described above, the excess-current prevention calculation map MP is stored in the storage unit 515.

Since the configuration of the excess-current prevention calculation map MP is similar to that in a case of (2-1) described above, descriptions thereof are omitted.

When a DC voltage and a rotation number of an electric motor are given as arguments to the excess-current prevention calculation map MP stored in the storage unit 515, a range of an electric motor drive torque in which the one-pulse control is performable at the DC voltage and the rotation number of the electric motor, that is, for example, an upper limit torque and a lower limit torque of the one-pulse control, is calculated.

The excess-current prevention one-pulse prohibition determination unit 511 calculates the upper limit torque and the lower limit torque of the one-pulse control on the basis of the DC voltage and the rotation number of the electric motor that are included in the acquired motor information MI and the excess-current prevention calculation map MP that is stored in the storage unit 515. The excess-current prevention one-pulse prohibition determination unit 511 compares the calculated upper and lower limit torques of the one-pulse control with the electric motor drive torque included in the motor information MI. The excess-current prevention one-pulse prohibition determination unit 511 determines that the electric motor is driven under the one-pulse control in a case where, as a result of the comparison, the electric motor drive torque is in a range of the upper and lower limit torques of the one-pulse control.

That is, the excess-current prevention one-pulse prohibition determination unit 511 drives the electric motor under the one-pulse control according to a comparison between the electric motor drive torque and a range of the electric motor drive torque in which the one-pulse control is performable that is calculated on the basis of the excess-current prevention calculation map MP, the rotation number of the electric motor, and the DC voltage of the electric motor.

In this example, the control apparatus 50 performs a determination on the basis of whether or not the drive current is excessive; however, the embodiment is not limited thereto. The control apparatus 50 may perform a determination on the basis of whether or not a drive voltage is excessive. Specifically, the control apparatus 50 may include an excess-voltage prevention one-pulse prohibition determination unit (not shown) in place of (or in addition to) the excess-current prevention one-pulse prohibition determination unit 511 described above.

The excess-voltage prevention one-pulse prohibition determination unit calculates a voltage generated between lines of the motor 30 in a case where the one-pulse control is performed. The excess-voltage prevention one-pulse prohibition determination unit determines whether or not the voltage becomes an excess voltage on the basis of a voltage applied to the motor 30. When it is determined that the voltage becomes an excess voltage, the excess-voltage prevention one-pulse prohibition determination unit provides, to the one-pulse request arbitration unit 514, information indicating whether or not the one-pulse drive is prohibited.

The generation of the excess voltage may be prevented by forming the excess-voltage prevention one-pulse prohibition determination unit in this way.

The motor NV one-pulse prohibition determination unit 512 acquires motor information MI from the motor information acquisition part 53. The motor NV one-pulse prohibition determination unit 512 calculates a NV level of the motor 30 when the one-pulse control is performed on the basis of the acquired motor information MI. The NV level of the motor 30 is a measure indicating a magnitude of noise or vibration generated by the driving of the motor 30. The motor NV one-pulse prohibition determination unit 512 determines whether or not the one-pulse control is performed on the basis of the calculated NV level.

That is, the motor NV one-pulse prohibition determination unit 512 calculates a noise value at a time of the one-pulse control on the basis of the electric motor drive torque (drive torque of the motor 30) and the rotation number and the DC voltage of the electric motor (motor 30) and thereby uses the noise value for a predetermined condition.

The motor NV one-pulse prohibition determination unit 512 provides, to the one-pulse request arbitration unit 514, motor NV one-pulse prohibition information NVPI which is information indicating whether or not the one-pulse drive is prohibited.

The resolver learning one-pulse prohibition determination unit 513 acquires resolver learning information RI from the resolver learning information acquisition part 54. The resolver learning one-pulse prohibition determination unit 513 determines whether or not the one-pulse control is performed on the basis of the acquired resolver learning information RI.

That is, the resolver learning one-pulse prohibition determination unit 513 determines whether phase sensor error information is calculable on the basis of the resolver learning information RI and uses the phase sensor error information for a second predetermined condition.

The resolver learning one-pulse prohibition determination unit 513 provides, to the one-pulse request arbitration unit 514, resolver learning one-pulse prohibition information RPI which is information indicating whether or not the one-pulse drive is prohibited.

The one-pulse request arbitration unit 514 acquires the loss-minimized one-pulse request information PRI from the one-pulse request determination part 51, acquires the excess-current prevention one-pulse prohibition information CPI from the excess-current prevention one-pulse prohibition determination unit 511, acquires the motor NV one-pulse prohibition information NVPI from the motor NV one-pulse prohibition determination unit 512, and acquires the resolver learning one-pulse prohibition information RPI from the resolver learning one-pulse prohibition determination unit 513. The one-pulse request arbitration unit 514 determines whether or not the one-pulse control is performed on the basis of the acquired information. The one-pulse request arbitration unit 514 provides, to the drive part 52, information on whether or not the one-pulse control is performed as one-pulse drive information ODI.

The drive part 52 acquires the one-pulse drive information ODI from the one-pulse request determination part 51.

The drive part 52 drives the motor 30 on the basis of the information indicated by the one-pulse drive information ODI. Specifically, the drive part 52 drives a switching element included in the inverter 10.

When the one-pulse drive information ODI indicates the one-pulse control, the drive part 52 drives the motor 30 under the one-pulse control. That is, the drive part 52 drives the motor 30 under the one-pulse control in accordance with the predetermined condition based on the electric motor drive torque, the rotation number of the electric motor, and the DC voltage of the electric motor.

When the one-pulse drive information ODI does not indicate the one-pulse control, the drive part 52 drives the motor 30 under a control (multi-pulse control such as a PWM control) other than the one-pulse control.

The control apparatus 50 may include a manual one-pulse request acquisition part 55.

The manual one-pulse request acquisition part 55 acquires a manual one-pulse request OR from a vehicle control ECU (not shown). In an example, the manual one-pulse request OR is a request that causes the drive part 52 to perform the one-pulse control regardless of a determination based on the information acquired by the one-pulse request arbitration unit 514. The manual one-pulse request acquisition part 55 provides the manual one-pulse request OR to the one-pulse request arbitration unit 514.

The one-pulse request determination part 51 may have a configuration in which the one-pulse request arbitration unit 514 acquires the motor information MI from the motor information acquisition part 53. In a case where the one-pulse request arbitration unit 514 acquires the motor information MI from the motor information acquisition part 53, the one-pulse request arbitration unit 514 can determine whether or not the one-pulse control is performed on the basis of the motor information MI.

[Operation of Control Apparatus 50]

Figure 9:
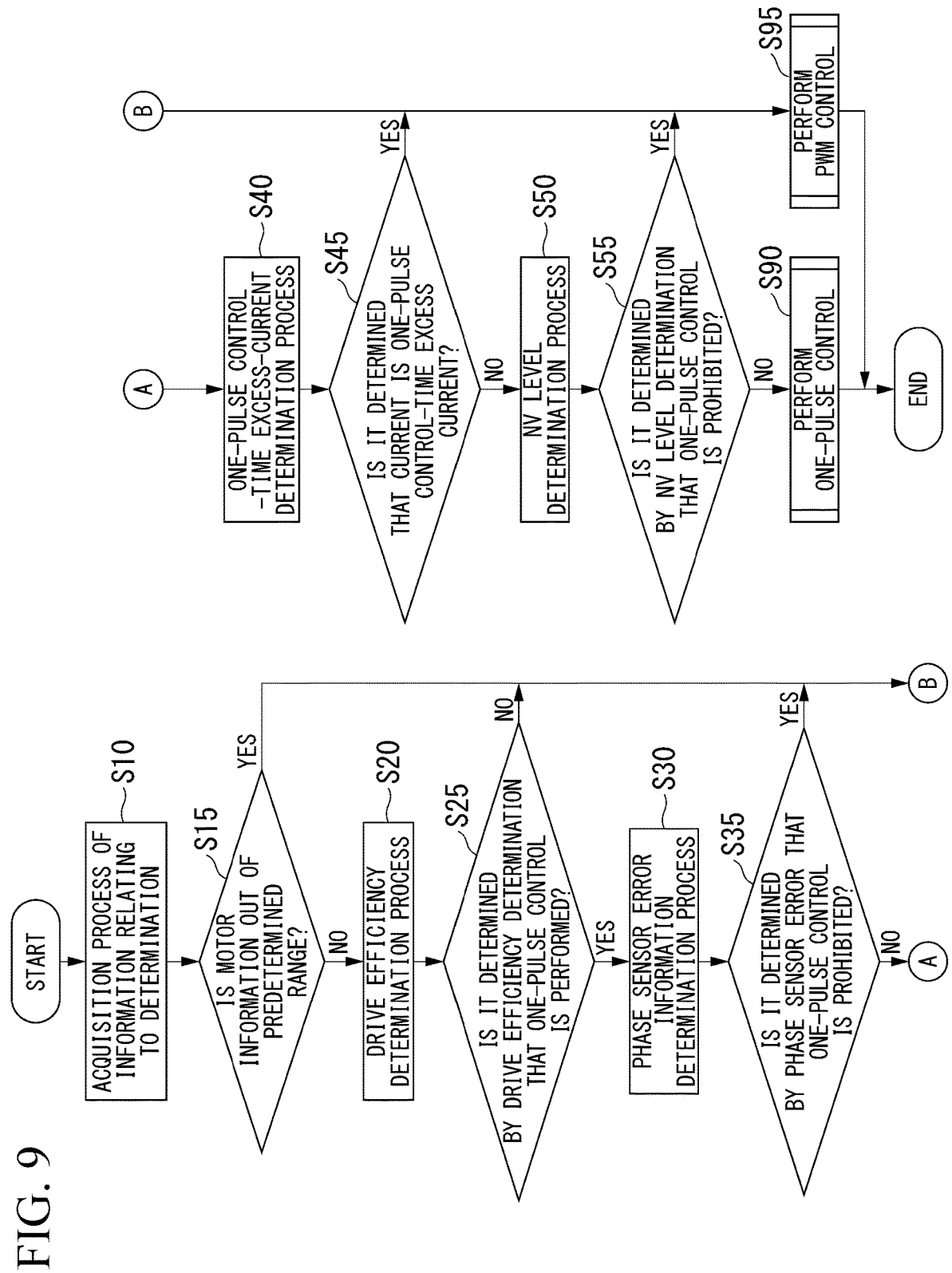
FIG. 9 is a view showing an example of a series of operations of a one-pulse drive determination by a one-pulse request determination part according to the embodiment.

FIG. 9 is a view showing an example of a series of operations of a one-pulse drive determination by the one-pulse request determination part 51 according to the embodiment.

(Step S10) The one-pulse request determination part 51 performs an acquisition process of information relating to the determination.

Specifically, the loss-minimized one-pulse request determination unit 510, the excess-current prevention one-pulse prohibition determination unit 511, and the motor NV one-pulse prohibition determination unit 512 acquire the motor information MI from the motor information acquisition part 53. The resolver learning one-pulse prohibition determination unit 513 acquires the resolver learning information RI from the resolver learning information acquisition part 54. The one-pulse request arbitration unit 514 acquires the motor information MI from the motor information acquisition part 53. The one-pulse request arbitration unit 514 advances the process to Step S15.

(Step S15) The one-pulse request arbitration unit 514 determines, on the basis of the information shown in the motor information MI, whether or not each information is within a predetermined value range. For example, when the value of the motor information MI is an abnormal value, there is a possibility of a sensor failure or the like. Accordingly, the one-pulse request determination part 51 performs the PWM control regardless of a determination process on whether or not the one-pulse control is performed described later. That is, when the motor information MI is out of the predetermined range (Step S15; YES), the one-pulse request arbitration unit 514 advances the process to Step S95. When the motor information MI is within the predetermined range (Step S15; NO), the one-pulse request arbitration unit 514 advances the process to Step S20.

(Step S20) The loss-minimized one-pulse request determination unit 510 performs a drive efficiency determination process on the basis of the acquired motor information MI. The drive efficiency determination process is a process of comparing an efficiency when the one pulse control is performed with an efficiency when the PWM control is performed and determining whether or not the one-pulse control is performed.

For example, the loss-minimized one-pulse request determination unit 510 selects a control method having a smaller loss. The loss-minimized one-pulse request determination unit 510 advances the process to Step S25.

(Step S25) The loss-minimized one-pulse request determination unit 510 provides, as loss-minimized one-pulse request information PRI, information on whether or not the one-pulse control is performed which is determined by the drive efficiency determination process to the one-pulse request arbitration unit 514. When it is determined by the drive efficiency determination process that the one-pulse control is performed (Step S25; YES), the loss-minimized one-pulse request determination unit 510 advances the process to Step S30. When it is determined by the drive efficiency determination process that the one-pulse control is not performed (Step S25; NO), the loss-minimized one-pulse request determination unit 510 advances the process to Step S95.

(Step S30) The resolver learning one-pulse prohibition determination unit 513 performs a phase sensor error information determination process on the basis of the acquired resolver learning information RI. The phase sensor error information determination process determines whether or not the one-pulse control is prohibited on the basis of the information indicated by the resolver learning information RI. As an example, the phase sensor error information determination process determines whether or not the one-pulse control is prohibited on the basis of information on whether the resolver has learned or has not learned. In this case, for example, the resolver learning one-pulse prohibition determination unit 513 can prohibit the one-pulse control when the resolver has not learned.

(Step S35) The resolver learning one-pulse prohibition determination unit 513 provides, as resolver learning information RI, information on whether or not the one-pulse control is prohibited which is determined by the phase sensor error information determination process to the one-pulse request arbitration unit 514. When it is determined by the phase sensor error information determination process that the one-pulse control is prohibited (Step S35; YES), the resolver learning one-pulse prohibition determination unit 513 advances the process to Step S95. When it is determined by the phase sensor error information determination process that the one-pulse control is not prohibited (Step S35; NO), the resolver learning one-pulse prohibition determination unit 513 advances the process to Step S40.

(Step S40) The excess-current prevention one-pulse prohibition determination unit 511 performs a one-pulse control-time excess-current determination process on the basis of the acquired motor information MI. The one-pulse control-time excess-current determination process is a process of calculating a current value when the one-pulse control is performed on the basis of the information indicated by the motor information MI and determining whether or not an excess current flows at a time of the one-pulse control.

A specific example of a feasibility determination of the one-pulse control by the excess-current prevention one-pulse prohibition determination unit 511 in Step S40 is described with reference to FIG. 10 to FIG. 12.

Figure 10:
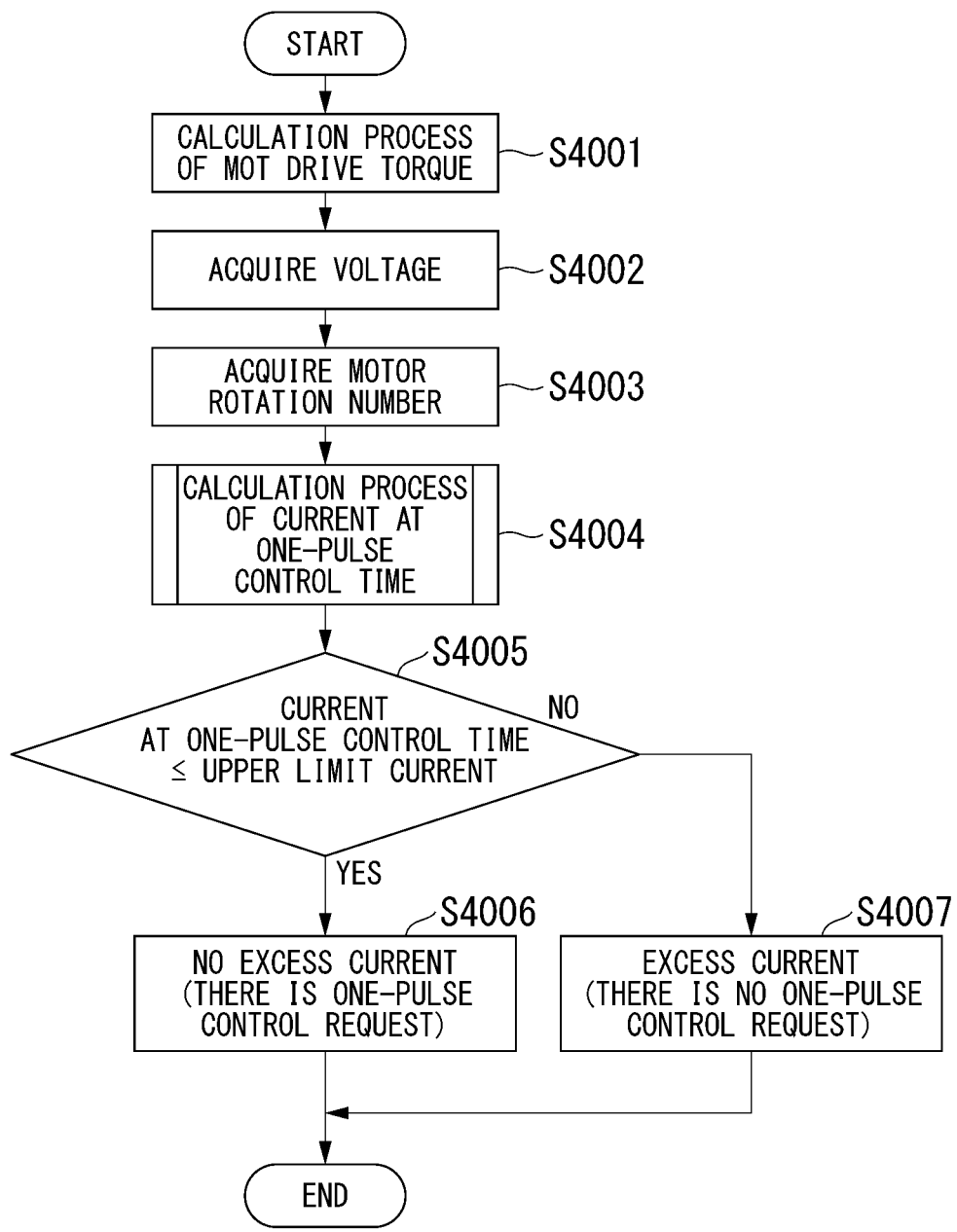
FIG. 10 is a view showing an example of a feasibility determination operation on the basis of a drive current at the one-pulse control time according to the embodiment.

(1) Feasibility Determination According to Comparison Between Drive Current Value at One-Pulse Control Time and Predetermined Upper Limit Current Value FIG. 10 is a view showing an example of a feasibility determination operation on the basis of a drive current at the one-pulse control time according to the embodiment. In an example, the storage unit 515 stores a calculation formula of the drive current at the one-pulse control time and a predetermined upper limit current value.

(Step S4001) The excess-current prevention one-pulse prohibition determination unit 511 calculates the electric motor drive torque on the basis of the motor information MI acquired in Step S10.

(Step S4002) The excess-current prevention one-pulse prohibition determination unit 511 acquires the DC voltage included in the motor information MI.

(Step S4003) The excess-current prevention one-pulse prohibition determination unit 511 acquires the rotation number of the electric motor included in the motor information MI.

(Step S4004) The excess-current prevention one-pulse prohibition determination unit 511 calculates the magnitude of the drive current at the one-pulse control time on the basis of each value calculated or acquired in Step S4001 to Step S4003 and the calculation formula of the drive current at the one-pulse control time stored in the storage unit 515.

(Step S4005) The excess-current prevention one-pulse prohibition determination unit 511 compares the magnitude of the drive current at the one-pulse control time calculated in Step S4004 with the predetermined upper limit current value stored in the storage unit 515. When the magnitude of the drive current at the one-pulse control time is equal to or less than the predetermined upper limit current value (Step S4005; YES), the excess-current prevention one-pulse prohibition determination unit 511 advances the process to Step S4006. When the magnitude of the drive current at the one-pulse control time exceeds the predetermined upper limit current value (Step S4005; NO), the excess-current prevention one-pulse prohibition determination unit 511 advances the process to Step S4007.

(Step S4006) The excess-current prevention one-pulse prohibition determination unit 511 determines that no excess current occurs at the one-pulse control time, sets the one-pulse control request as "there is a request", and advances the process to Step S45 of FIG. 9.

(Step S4007) The excess-current prevention one-pulse prohibition determination unit 511 determines that an excess current occurs at the one-pulse control time, sets the one-pulse control request as "there is no request", and advances the process to Step S45 of FIG. 9.

Figure 11:
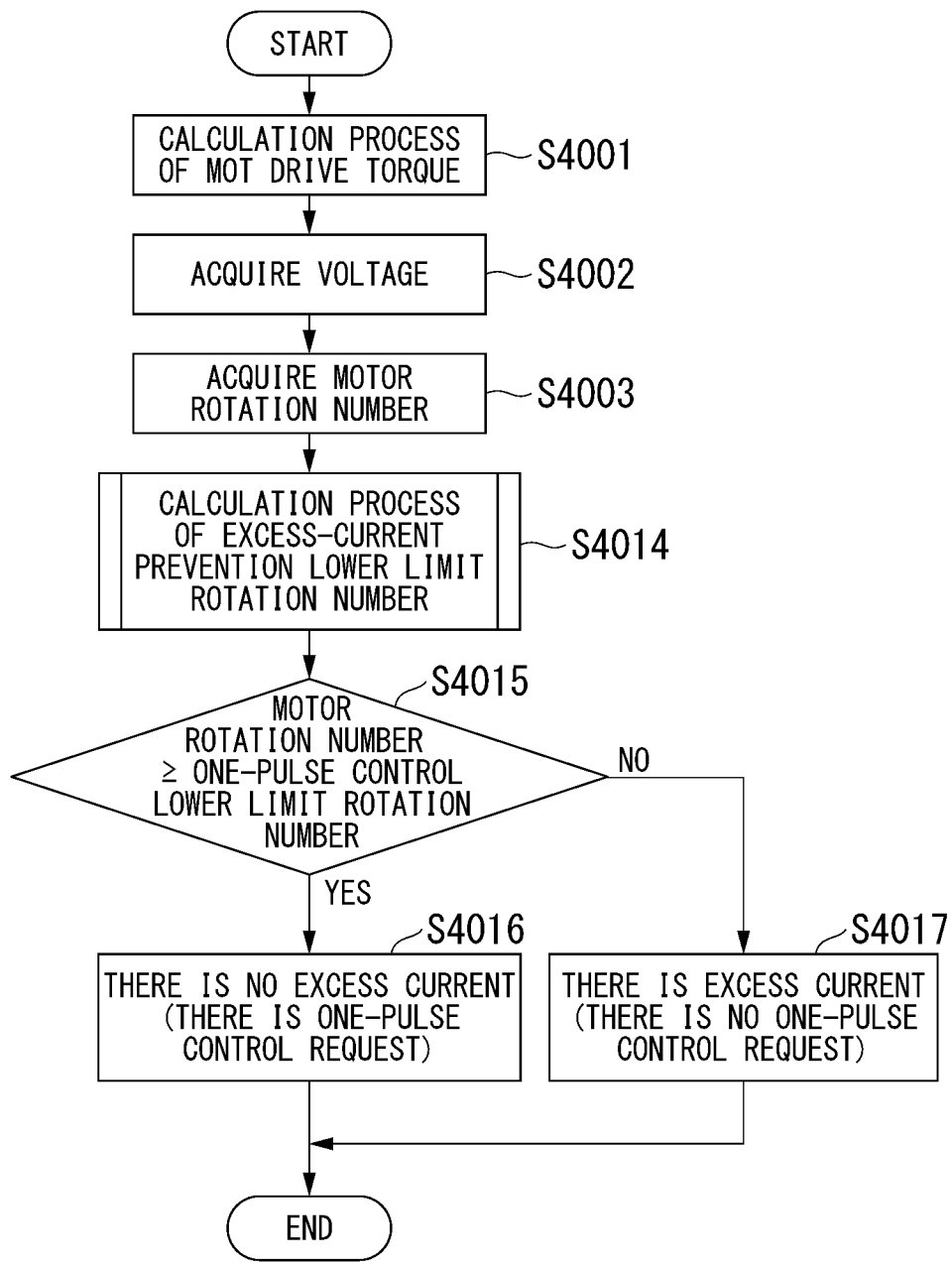
FIG. 11 is a view showing an example of a feasibility determination operation on the basis of the DC voltage and the rotation number according to the embodiment.

(2-1) Feasibility Determination of One-Pulse Control Based on DC Voltage and Electric Motor Drive Torque FIG. 11 is a view showing an example of a feasibility determination operation on the basis of the DC voltage and the rotation number according to the embodiment. In an example, the excess-current prevention calculation map MP is stored in the storage unit 515. Since the operations of Step S4001 to Step S4003 shown in FIG. 11 are the same as the operations of Step S4001 to Step S4003 described above, descriptions thereof are omitted.

(Step S4014) The excess-current prevention one-pulse prohibition determination unit 511 calculates the one-pulse control lower limit rotation number on the basis of each value calculated or acquired in Step S4001 to Step S4003 and the excess-current prevention calculation map MP stored in the storage unit 515.

(Step S4015) The excess-current prevention one-pulse prohibition determination unit 511 compares the rotation number of the electric motor acquired in Step S4003 with the one-pulse control lower limit rotation number calculated in Step S4014. The excess-current prevention one-pulse prohibition determination unit 511 advances the process to Step S4016 when the rotation number of the electric motor exceeds the predetermined one-pulse control lower limit rotation number (Step S4015; YES). The excess-current prevention one-pulse prohibition determination unit 511 advances the process to Step S4017 when the rotation number of the electric motor is equal to or less than the predetermined one-pulse control lower limit rotation number (Step S4015; NO).

(Step S4016) The excess-current prevention one-pulse prohibition determination unit 511 determines that no excess current occurs at the one-pulse control time, sets the one-pulse control request as "there is a request", and advances the process to Step S45 of FIG. 9.

(Step S4017) The excess-current prevention one-pulse prohibition determination unit 511 determines that an excess current occurs at the one-pulse control time, sets the one-pulse control request as "there is no request", and advances the process to Step S45 of FIG. 9.

Figure 12:
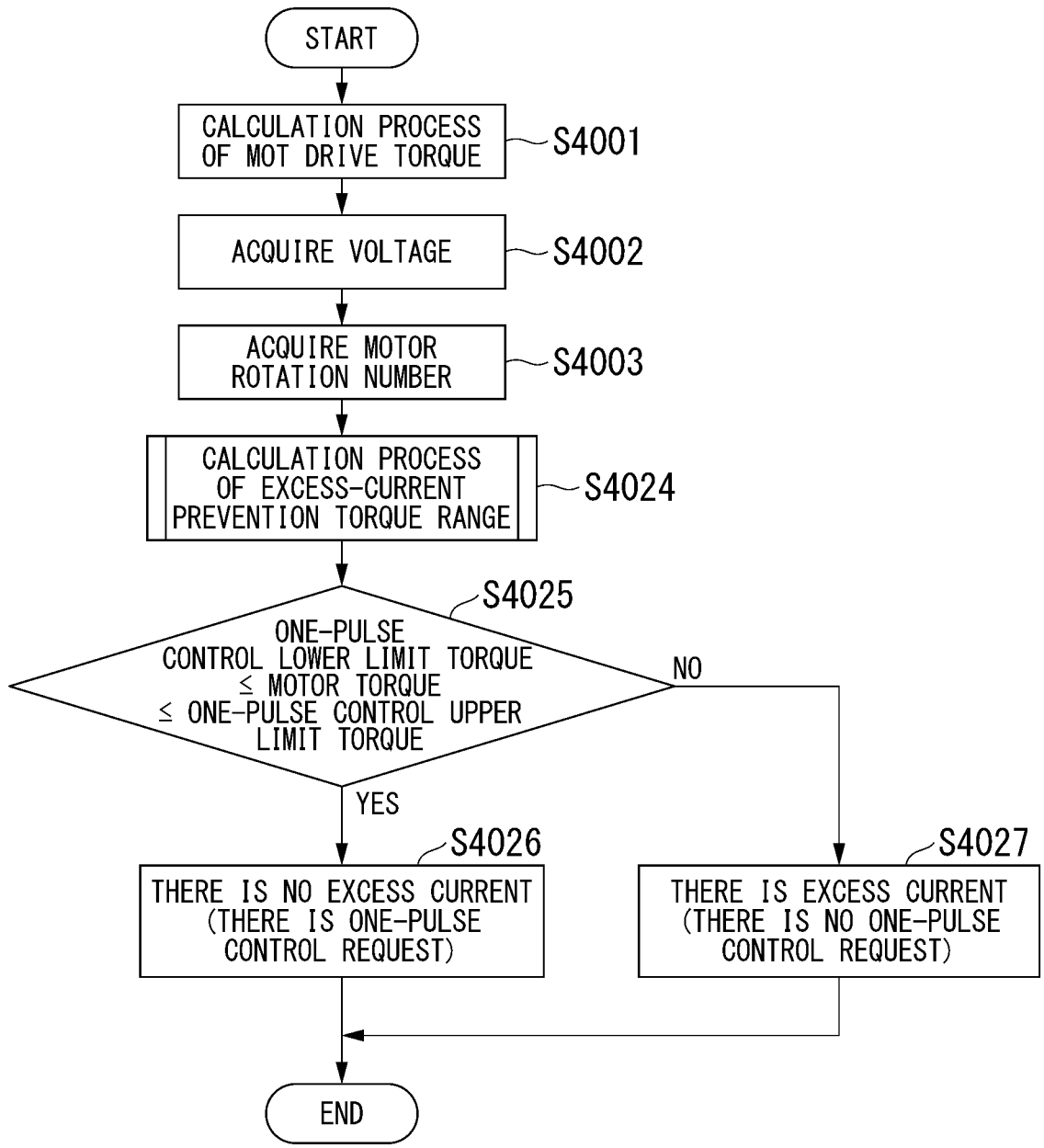
FIG. 12 is a view showing an example of a feasibility determination operation on the basis of the DC voltage and the electric motor drive torque according to the embodiment.

(2-2) Feasibility Determination of One-Pulse Control Based on DC Voltage and Electric Motor Drive Torque FIG. 12 is a view showing an example of a feasibility determination operation on the basis of the DC voltage and the electric motor drive torque according to the embodiment. In an example, the excess-current prevention calculation map MP is stored in the storage unit 515. Since the operations of Step S4001 to Step S4003 shown in FIG. 12 are the same as the operations of Step S4001 to Step S4003 described above, descriptions thereof are omitted.

(Step S4024) The excess-current prevention one-pulse prohibition determination unit 511 calculates a torque range (for example, the upper limit torque and the lower limit torque) of the one-pulse control on the basis of each value calculated or acquired in Step S4001 to Step S4003 and the excess-current prevention calculation map MP stored in the storage unit 515.

(Step S4025) The excess-current prevention one-pulse prohibition determination unit 511 compares the electric motor drive torque calculated in Step S4001 with the torque range of the one-pulse control calculated in Step S4024. The excess-current prevention one-pulse prohibition determination unit 511 advances the process to Step S4026 when the electric motor drive torque is within the torque range of the one-pulse control (Step S4025; YES). The excess-current prevention one-pulse prohibition determination unit 511 advances the process to Step S4027 when the electric motor drive torque is not within the torque range of the one-pulse control (Step S4025; NO).

(Step S4026) The excess-current prevention one-pulse prohibition determination unit 511 determines that no excess current occurs at the one-pulse control time, sets the one-pulse control request as "there is a request", and advances the process to Step S45 of FIG. 9.

(Step S4027) The excess-current prevention one-pulse prohibition determination unit 511 determines that an excess current occurs at the one-pulse control time, sets the one-pulse control request as "there is no request", and advances the process to Step S45 of FIG. 9.

(Step S45) With reference back to FIG. 9, the excess-current prevention one-pulse prohibition determination unit 511 provides, as excess-current prevention one-pulse prohibition information CPI, information on whether or not an excess current occurs at the one-pulse control time which is determined by the one-pulse control-time excess current determination process (that is, Step S40 described above) to the one-pulse request arbitration unit 514. When it is determined by the one-pulse control-time excess current determination process that the current is the one-pulse control-time excess current (Step S45; YES), the excess-current prevention one-pulse prohibition determination unit 511 advances the process to Step S95. When it is determined by the one-pulse control-time excess current determination process that the current is not the one-pulse control-time excess current (Step S45; NO), the excess-current prevention one-pulse prohibition determination unit 511 advances the process to Step S50.

(Step S50) The motor NV one-pulse prohibition determination unit 512 performs a NV level determination process on the basis of the acquired motor information MI. The NV level determination process is a process of calculating a NV level when the one-pulse control is used and determining whether or not the one-pulse control is prohibited on the basis of the calculated NV level. As an example, when the calculated NV level is equal to or more than a predetermined value, the motor NV one-pulse prohibition determination unit 512 determines that one-pulse control is prohibited.

(Step S55) The motor NV one-pulse prohibition determination unit 512 provides, as motor NV one-pulse prohibition information NVPI, information on whether or not the one-pulse control is prohibited which is determined by the NV level determination process to the one-pulse request arbitration unit 514. When it is determined by the NV level determination process that the one-pulse control is prohibited (Step S55; YES), the motor NV one-pulse prohibition determination unit 512 advances the process to Step S95. When it is determined by the NV level determination process that the one-pulse control is not prohibited (Step S55; NO), the motor NV one-pulse prohibition determination unit 512 advances the process to Step S90.

(Step S90) The one-pulse request arbitration unit 514 provides information indicating that the one-pulse control is performed as one-pulse drive information ODI to the drive part 52.

When the one-pulse drive information ODI is acquired from the one-pulse request arbitration unit 514, the drive part 52 drives the motor 30 on the basis of the information indicated in the one-pulse drive information ODI. In this case, since the one-pulse drive information ODI includes the information indicating that the one-pulse control is performed, the drive part 52 drives the motor 30 under the one-pulse control. The drive part 52 terminates the process when the motor 30 is driven under the one-pulse control.

(Step S95) The one-pulse request arbitration unit 514 provides information indicating that the PWM control is performed as one-pulse drive information ODI to the drive part 52.

When the one-pulse drive information ODI is acquired from the one-pulse request arbitration unit 514, the drive part 52 drives the motor 30 on the basis of the information indicated in the one-pulse drive information ODI. In this case, since the one-pulse drive information ODI includes the information indicating that the PWM control is performed, the drive part 52 drives the motor 30 under the PWM control. The drive part 52 terminates the process when the motor 30 is driven under the PWM control.

Hereinbefore, an example of a series of operations of the control apparatus 50 is described. The order of the determination by the one-pulse request determination part 51 is an actually performed order. That is, the one-pulse request determination part 51 performs the determination by the loss-minimized one-pulse request determination unit 510, performs the determination by the resolver learning one-pulse prohibition determination unit 513, performs the determination by the excess-current prevention one-pulse prohibition determination unit 511, and performs the determination by the motor NV one-pulse prohibition determination unit 512.

The order of the determinations performed by the one-pulse request determination part 51 is not limited to this example. The motor NV one-pulse prohibition determination unit 512 may perform the determinations in any order.

In the above-described embodiment, the order in which the determinations are performed is shown. However, the embodiment is not limited to this example. The determinations performed by the one-pulse request determination part 51 may be performed simultaneously or may be performed independently from one another.

With respect to the determinations performed by the one-pulse request determination part 51, it is sufficient that at least one determination is performed, and it is not necessary to perform all of the determinations.

SUMMARY OF ADVANTAGE OF EMBODIMENT

As described above using the embodiment, the control apparatus 50 includes the motor information acquisition part 53, the one-pulse request determination part 51, and the drive part 52. The one-pulse request determination part 51 includes the excess-current prevention one-pulse prohibition determination unit 511. The excess-current prevention one-pulse prohibition determination unit 511 determines whether or not the one-pulse control is performed by calculating the magnitude of the drive current at the one-pulse control time on the basis of the electric motor drive torque, the rotation number of the electric motor, and the DC voltage of the electric motor that are included in the information acquired from the motor information acquisition part 53.

In general, in the one-pulse control, since the switching frequency of the inverter is lower than that of the PWM control, electric power consumption is small, and it is possible to perform a control having a high efficiency. On the other hand, although the PWM control is unlikely to cause an excess current since a current control (for example, a feedback control by the drive current) is easily realized, the one-pulse control relies on a voltage control (or a phase control) and is therefore more likely to cause an excess current compared to the PWM control. As an example, when the rotation number of the electric motor is low (at low rotation), when the DC voltage is large (at a high voltage), or when the electric motor drive torque is low (at a low torque), an excess current is likely to occur. Accordingly, in general, a mechanism that prevents an excess current is required when controlling the electric motor by the one-pulse control.

The control apparatus 50 of the present embodiment includes the excess-current prevention one-pulse prohibition determination unit 511. The excess-current prevention one-pulse prohibition determination unit 511 determines the feasibility of the one-pulse control by determining whether or not an excess current flows when one-pulse control is performed. According to the control apparatus 50 having such a configuration, it is possible to perform a one-pulse control having a better efficiently than the PWM control while preventing an excess current from flowing through the electric motor.

Therefore, according to the control apparatus 50 of the present embodiment, it is possible to improve an electric power consumption efficiency (for example, an electric power cost) of the electric motor control while preventing an excess current.

Further, according to the control apparatus 50 of the present embodiment, the excess-current prevention one-pulse prohibition determination unit 511 determines the feasibility of the one-pulse control on the basis of a comparison between the predetermined upper limit value and the magnitude of the drive current at the one-pulse control time. Therefore, according to the control apparatus 50 of the present embodiment, it is possible to perform the one-pulse control while preventing an excess current from flowing through the electric motor using a relatively simple configuration.

Further, according to the control apparatus 50 of the present embodiment, the excess-current prevention one-pulse prohibition determination unit 511 determines the feasibility of the one-pulse control on the basis of the excess-current prevention calculation map MP. In the excess-current prevention calculation map MP, a threshold value that defines a region of the feasibility of the one-pulse control is determined in advance. Therefore, the excess-current prevention one-pulse prohibition determination unit 511 can determine the feasibility of the one-pulse control without performing a complicated calculation. Therefore, according to the control apparatus 50 of the present embodiment, it is possible to quickly switch the control from the PWM control to the one-pulse control during rotation of the electric motor since it is possible to determine the feasibility of the one-pulse control in a short time. According to the control apparatus 50 having such a configuration, it is possible to increase opportunities of performing the one-pulse control, and it is possible to improve an electric power consumption efficiency (for example, an electric power cost) of the electric motor control.

Further, the correspondence relationship among the electric motor drive torque, the rotation number of the electric motor, and the DC voltage of the electric motor is determined in advance in the excess-current prevention calculation map MP. Accordingly, by using the excess-current prevention calculation map MP, when at least two information among the electric motor drive torque, the rotation number of the electric motor, and the DC voltage of the electric motor are obtained, it is possible to calculate the rest of information. Therefore, according to the control apparatus 50 of the present embodiment, even if the type of information obtained from the electric motor is changed in response to a situation, it is possible to determine the feasibility of the one-pulse control while flexibly responding. According to the control apparatus 50 having such a configuration, it is possible to increase opportunities of performing the one-pulse control, and it is possible to improve an electric power consumption efficiency (for example, an electric power cost) of the electric motor control.

Although an embodiment of the present invention has been described with reference to the drawings, the present invention is not limited to such an embodiment, and various modifications and substitutions can be made without departing from the scope of the invention.

What is claimed is:

1. A control apparatus that controls an inverter which outputs electric power to an electric motor,
   wherein the control apparatus calculates a magnitude of a drive current at a one-pulse control time based on an electric motor drive torque of the electric motor, a rotation number of the electric motor, and a DC voltage of the electric motor and determines, based on the drive current having the calculated magnitude, which one of a one-pulse control and a pulse-width modulation control is employed as a control method of the inverter, and
   wherein the control apparatus has an excess-current prevention calculation map indicating a range in which the one-pulse control is performable by a correspondence relationship among the electric motor drive torque, the rotation number, and the DC voltage and
   determines which one of the one-pulse control and the pulse-width modulation control is employed according to a comparison between the rotation number and a range of the rotation number in which the one-pulse control is performable that is calculated based on the excess-current prevention calculation map, the electric motor drive torque, and the DC voltage.

2. The control apparatus according to claim 1,
   wherein the control apparatus employs the one-pulse control in a case where a magnitude of the drive current is less than a predetermined upper limit value.

3. A control apparatus that controls an inverter which outputs electric power to an electric motor,
   wherein the control apparatus calculates a magnitude of a drive current at a one-pulse control time based on an electric motor drive torque of the electric motor, a rotation number of the electric motor, and a DC voltage of the electric motor and determines, based on the drive current having the calculated magnitude, which one of a one-pulse control and a pulse-width modulation control is employed as a control method of the inverter, and
   wherein the control apparatus has an excess-current prevention calculation map indicating a range in which the one-pulse control is performable by a correspondence relationship among the electric motor drive torque, the rotation number, and the DC voltage and determines which one of the one-pulse control and the pulse-width modulation control is employed according to a comparison between the electric motor drive torque and a range of the electric motor drive torque in which the one-pulse control is performable that is calculated based on the excess-current prevention calculation map, the rotation number, and the DC voltage.

4. A vehicle system comprising:

the control apparatus according to according to claim 1; and a drive wheel that is driven by the control apparatus.

5. A control method including:

controlling an inverter which outputs electric power to an electric motor;

calculating a magnitude of a drive current at a one-pulse control time based on an electric motor drive torque of the electric motor, a rotation number of the electric motor, and a DC voltage of the electric motor;

determining, based on the drive current having the calculated magnitude, which one of a one-pulse control and a pulse-width modulation control is employed as a control method of the inverters;

having an excess-current prevention calculation map indicating a range in which the one-pulse control is performable by a correspondence relationship among the electric motor drive torque, the rotation number, and the DC voltage; and determining which one of the one-pulse control and the pulse-width modulation control is employed according to a comparison between the rotation number and a range of the rotation number in which the one-pulse control is performable that is calculated based on the excess-current prevention calculation map, the electric motor drive torque, and the DC voltage.

6. A control method including:

controlling an inverter which outputs electric power to an electric motor;

calculating a magnitude of a drive current at a one-pulse control time based on an electric motor drive torque of the electric motor, a rotation number of the electric motor, and a DC voltage of the electric motor;

determining, based on the drive current having the calculated magnitude, which one of a one-pulse control and a pulse-width modulation control is employed as a control method of the inverter;

having an excess-current prevention calculation map indicating a range in which the one-pulse control is performable by a correspondence relationship among the electric motor drive torque, the rotation number, and the DC voltage; and determining which one of the one-pulse control and the pulse-width modulation control is employed according to a comparison between the electric motor drive torque and a range of the electric motor drive torque in which the one-pulse control is performable that is calculated based on the excess-current prevention calculation map, the rotation number, and the DC voltage.

7. A control apparatus that controls an inverter which outputs electric power to an electric motor, wherein when a magnitude of a drive current of the electric motor is equal to or less than an upper limit value, a magnitude of noise or vibration of the electric motor is equal to or less than a reference value, and a drive efficiency of the electric motor satisfies a reference in a case where it is assumed that a one-pulse control is performed as a control method of the inverter based on a combination of an electric motor drive torque, a rotation number of the electric motor, and a DC voltage of the electric motor, and when a calibration of an assembly angle of a resolver relative to a rotor reference angle of the electric motor is performed, the one pulse control is performed as the control method of the inverter, and when the magnitude of the drive current of the electric motor exceeds the upper limit value, the magnitude of noise or vibration of the electric motor exceeds the reference value, and the drive efficiency of the electric motor does not satisfy the reference in a case where it is assumed that the one-pulse control is performed, or when the calibration of the assembly angle of the resolver relative to the rotor reference angle of the electric motor is not performed, a pulse-width modulation control is performed as the control method of the inverter.

\* \* \* \* \*